(No Model.)

T. H. RODENBOH.

FEED ROLL FOR PLANING MACHINES.

No. 269,118. Patented Dec. 12, 1882.

Witnesses
Harry Drury
Harry Smith

Inventor
Thomas H. Rodenboh
by his Attorneys
Howsen and Son

United States Patent Office.

THOMAS H. RODENBOH, OF PHILADELPHIA, PENNSYLVANIA.

FEED-ROLL FOR PLANING-MACHINES.

SPECIFICATION forming part of Letters Patent No. 269,118, dated December 12, 1882.

Application filed May 22, 1882. (No model.)

*To all whom it may concern:*

Be it known that I, THOMAS H. RODENBOH, a citizen of the United States, and a resident of Philadelphia, Pennsylvania, have invented an Improvement in Feed-Rolls for Wood-Working Machines, of which the following is a specification.

The object of my invention is to construct rubber-surfaced feed-rolls which can be readily applied to or removed from the feed-shafts of wood-planing machines, and this object I attain in the manner which I will proceed to describe, reference being had to the accompanying drawings, in which—

Figure 1:
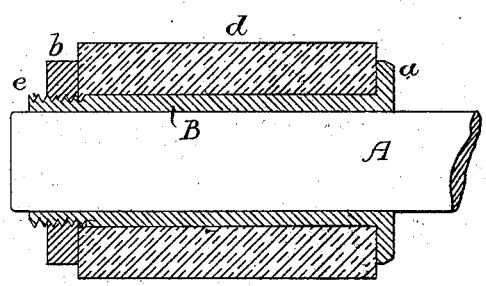
Figure 2:
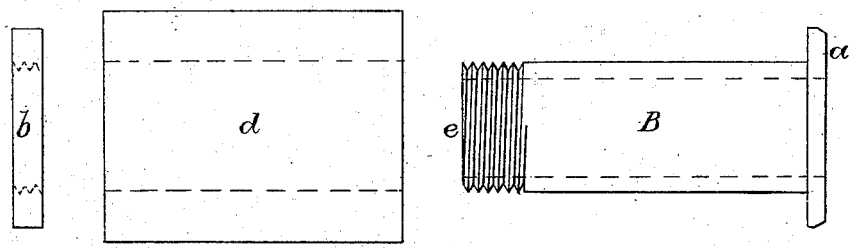
Figure 3:
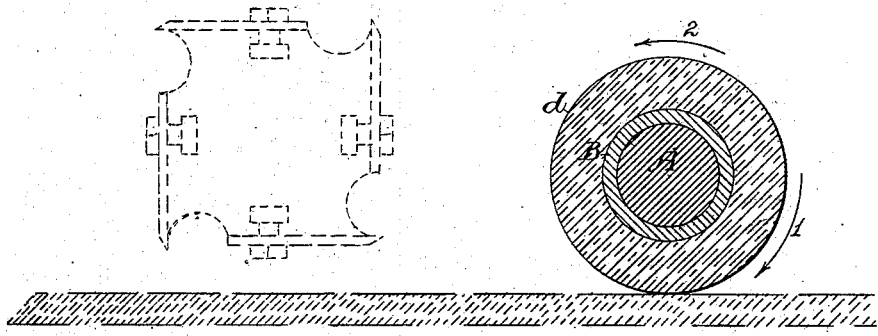

Figure 1 is a side view, partly in section, of my improved feed-roller; Fig. 2, a view of the parts detached from each other, and Fig. 3 a transverse section of the feed-roller.

A represents part of a feed-shaft of a wood-planing machine, a portion of the table or bed and the rotating cutting-tool being shown by dotted lines.

The roller consists of a metal sleeve, B, and a tube, *d*, of rubber, fitted tightly to the sleeve and confined thereto by and between a nut, *b*, adapted to the threaded end of the sleeve, and a permanent collar, *a*, at the opposite end of the same.

It should be explained that the exterior of the sleeve is made cylindrically true and plain for the reception and tight fitting of the short rubber tube, and that when the nut is screwed tight the rubber will so cling to the sleeve that it cannot be displaced by the torsion to which the roller is subjected.

The feed-roller is complete within itself, the rubber tube being fitted and tightened in its place on the sleeve, and properly trued, so that the roller can be applied to the shaft in the same manner as an ordinary wheel or pulley is detachably secured to a shaft.

The thread *e* on the sleeve and the corresponding thread in the nut should be right or left handed, according to the direction in which the roller has to turn, the direction of the thread being such that torsion on the rubber shall not have a tendency to unscrew the nut.

I am aware that in the manufacture of rollers for clothes-wringers long rubber tubes have been applied to shafts; but especial provision was made on the latter to prevent the displacement of the rubber by torsion, whereas this object is attained in my invention partly by the tight fitting of the short rubber tube to a plain sleeve and partly by a slight contraction of the tube endwise, which causes it to cling tightly to the sleeve.

I claim as my invention—

The within-described feed-roller, in which the metal sleeve B, having a bore adapted to a feed-shaft made cylindrically true externally, and provided with a collar, *a*, and nut *d*, is combined with a short rubber tube fitted tightly to the sleeve and confined thereto by end pressure imparted by the nut, as set forth.

In testimony whereof I have signed my name to this specification in the presence of two subscribing witnesses.

THOMAS H. RODENBOH.

Witnesses:
HARRY DRURY,
HARRY SMITH.